Oct. 25, 1949.   C. M. JAMESON   2,486,289
HOLDING VALVE DEVICE FOR FLUID OPERATED BRAKES
Original Filed Sept. 24, 1942   3 Sheets-Sheet 2
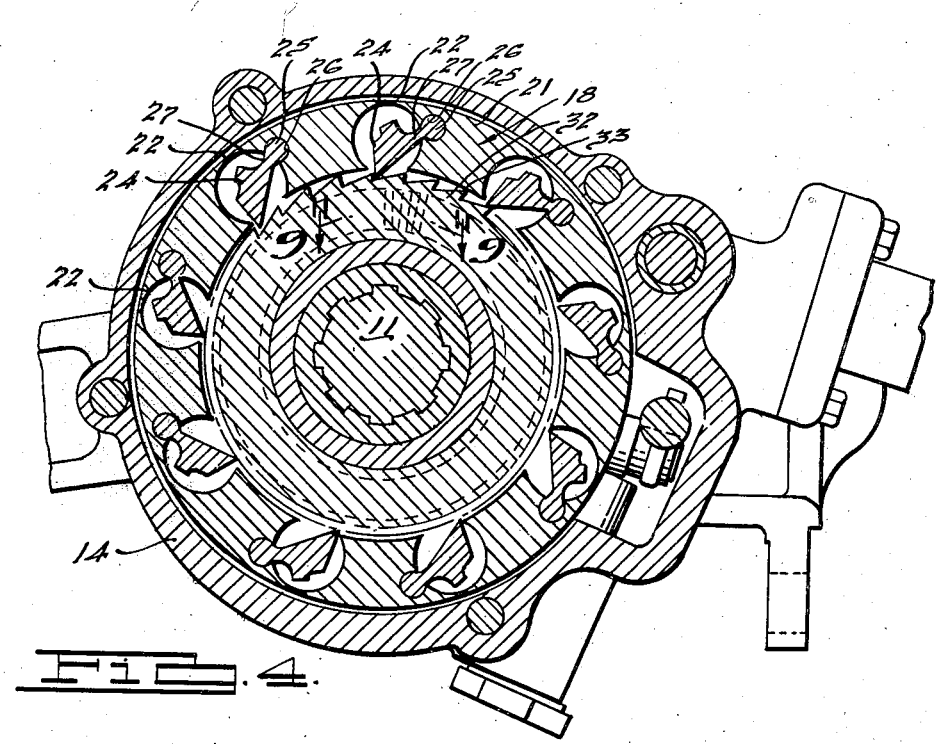
FIG. 4.
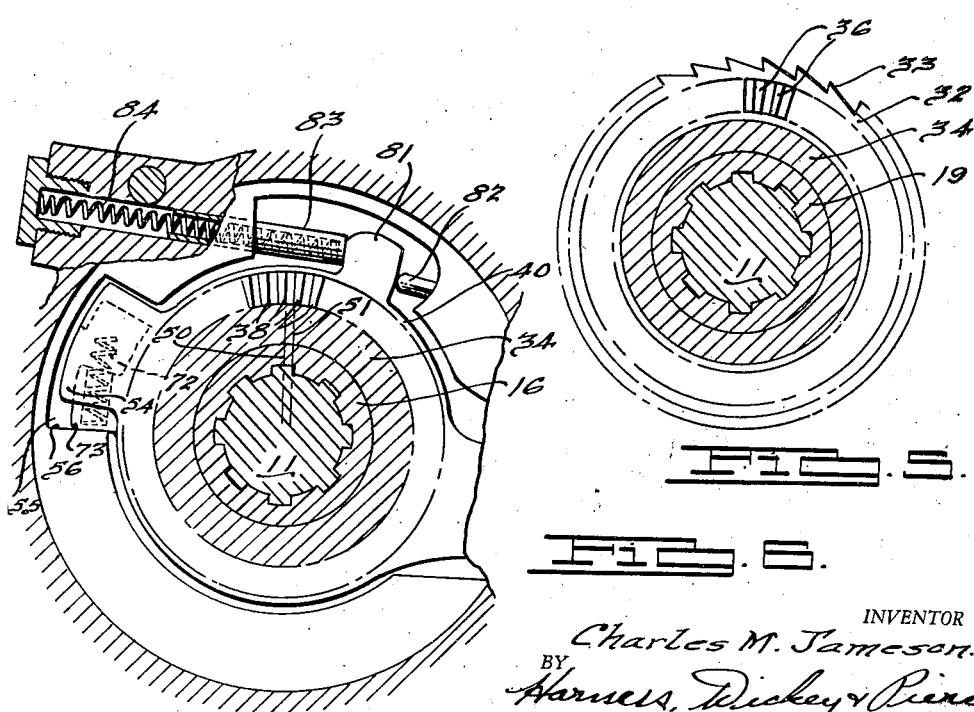
FIG. 5.
FIG. 6.
INVENTOR
Charles M. Jameson.
BY Harness, Dickey & Pierce
ATTORNEYS.

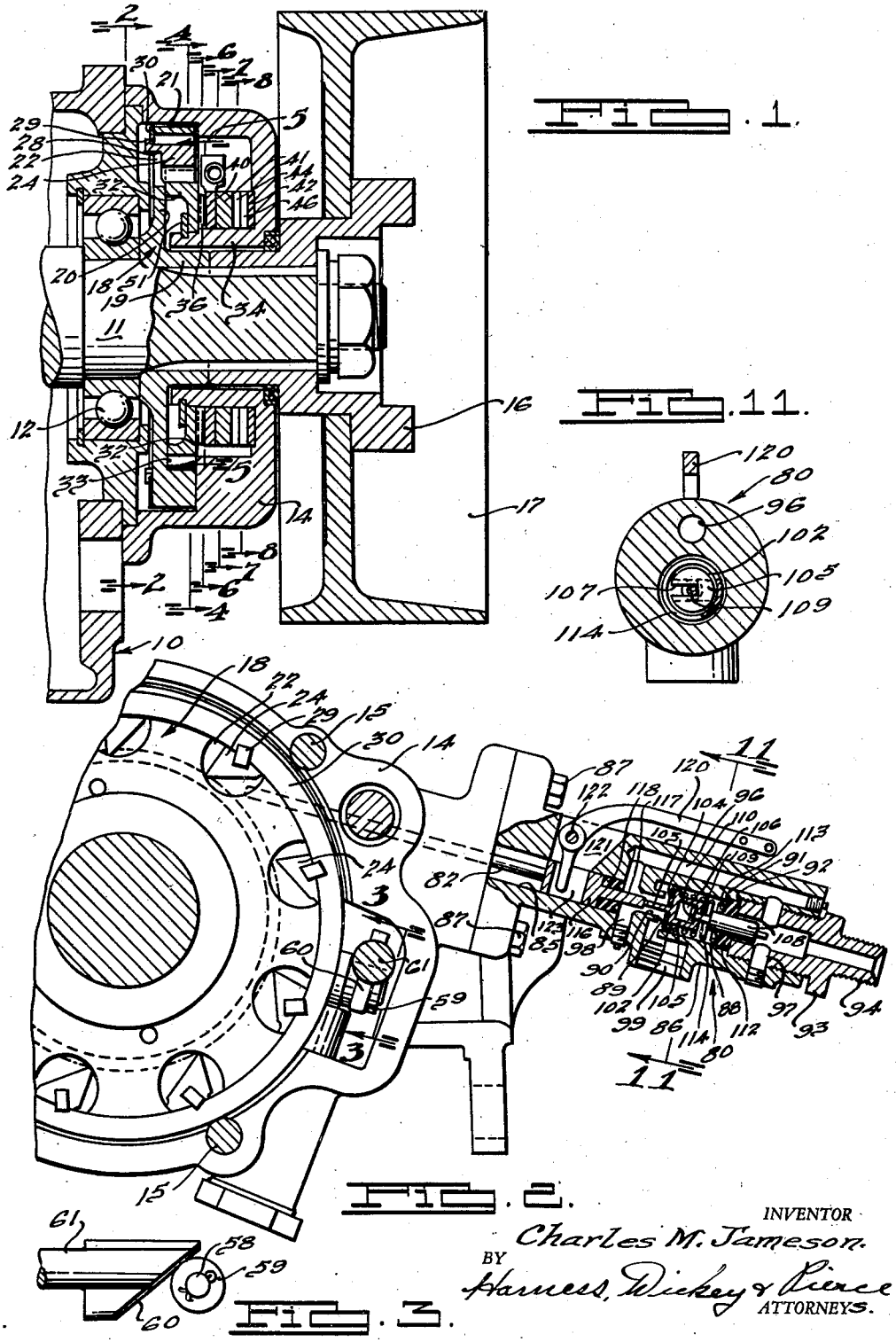

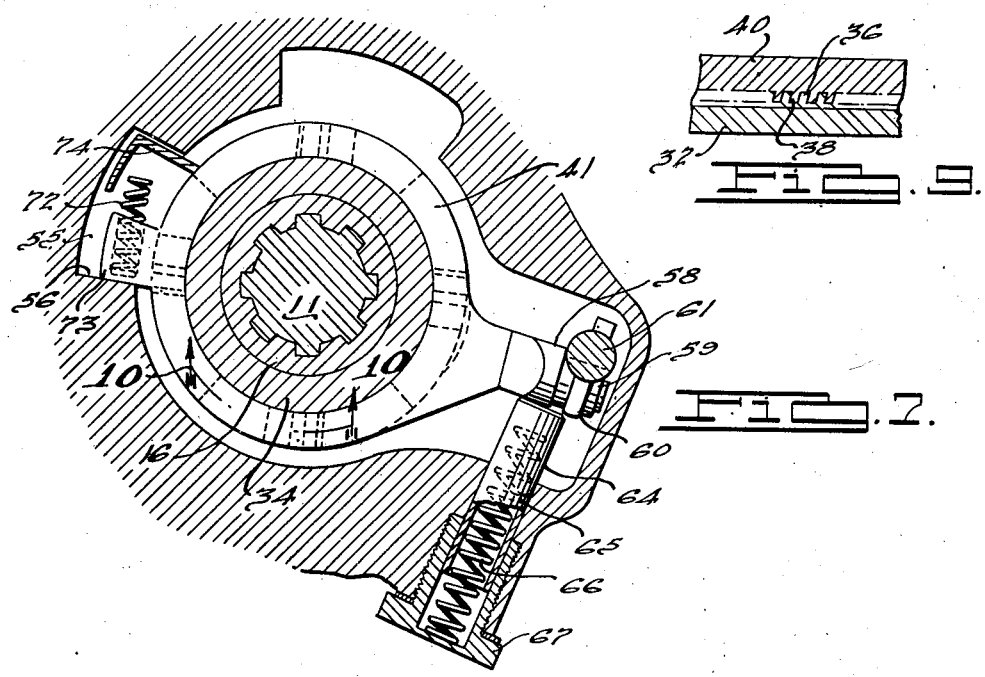

Patented Oct. 25, 1949

2,486,289

UNITED STATES PATENT OFFICE 2,486,289

HOLDING VALVE DEVICE FOR FLUID OPERATED BRAKES

Charles M. Jameson, Detroit, Mich.

Original application September 24, 1942, Serial No. 459,536, now Patent No. 2,381,755, dated August 7, 1945. Divided and this application November 12, 1942, Serial No. 465,320

17 Claims. (Cl. 137—139)

1

The present invention relates to an apparatus for maintaining a vehicle against unauthorized movement, and in general it embodies improvements upon the type of apparatus disclosed in applicant's prior patent, No. 2,218,398, wherein means are provided for automatically maintaining the brakes of a motor vehicle applied after the vehicle has been brought to rest by application of the brakes in combination with means acting automatically when the vehicle is driven forward to render the brake holding means inoperative and thereby permit disengagement of the brakes. The device of the prior patent, as well as that of the present invention, also incorporates means acting automatically to prevent unauthorized retrograde movement of the vehicle. This application is a division of applicant's co-pending application, Serial No. 459,536, filed September 24, 1942, and now Patent No. 2,381,755, granted August 7, 1945, has been added.

It is the general object of the present invention to improve and simplify the various details of construction of the brake and vehicle holding device disclosed in the above-mentioned patent.

It is another object of the present invention to provide an improved check valve mechanism for use in fluid braking systems to hold the fluid actuated brakes engaged, which valve is operated under control of a holding mechanism associated with a driven element of the vehicle power transmission system.

Other objects and advantages of the invention will become apparent from the following specification, the drawings relating thereto, and from the claims hereinafter set forth.

In the drawings, in which like numerals are used to designate like parts in the several views throughout:

Figure 1 is a longitudinal section through one form of the present invention showing the mechanism mounted at the rear of an ordinary transmission housing;

Figure 2 is a fragmentary section taken on the line 2—2 of Figure 1, showing the check valve mechanism in longitudinal section;

Figure 3 is a fragmentary view taken on the line 3—3 of Figure 2;

Figure 4 is a transverse section taken on the line 4—4 of Figure 1;

Figure 5 is a transverse section taken on the line 5—5 of Figure 1;

Figure 6 is a transverse section taken on the line 6—6 of Figure 1;

Figure 7 is a transverse section taken on the line 7—7 of Figure 1;

2

Figure 8 is a transverse section taken on the line 8—8 of Figure 1;

Figure 9 is a fragmentary section taken on the line 9—9 of Figure 4;

Figure 10 is a fragmentary section taken on the line 10—10 of Figure 7;

Figure 11 is a view of the check valve taken on the line 11—11 of Figure 2.

Figures 1 to 11, inclusive, of the drawings illustrate one form of the invention comprising a mechanical holding unit in combination with a novel and improved form of check valve mechanism for the braking system of a vehicle. The mechanical unit employed is generally similar to that disclosed in applicant's prior patents, Nos. 2,135,897 and 2,218,398, but contains a number of improved features.

As best shown in Figure 1, the mechanical unit in the present case is mounted at the rear of the vehicle transmission on the driven shaft thereof. The transmission casing is indicated generally at 10 and the driven shaft of the transmission at 11. The driven shaft 11 is mounted in a ball bearing 12 carried by the casing 10. An auxiliary housing 14 encloses the mechanical holding unit of the device and is bolted or otherwise fixed to the transmission casing in any suitable manner, as by bolts 15 shown in Figure 2. The shaft 11 projects rearwardly through and beyond the housing 14 and carries a universal joint hub yoke 16 upon which is mounted an emergency brake drum 17 in the conventional manner.

The mechanical unit includes a pawl carrier indicated generally at 18 comprising a hub 19, which is keyed or otherwise fixed to the shaft 11, a web portion 20, and a thickened annular rim portion 21 adapted to carry the pawls.

As best shown in Figure 4, the pawl carrier incorporates an improved and simplified pawl mounting arrangement consisting of a plurality of drilled holes 22 which extend entirely through the rim 21 and which intersect the inner annular surface of the rim 21 to form inwardly facing openings through which the points of the pawls may project. Each opening 22 receives a pawl 24 provided with an integral trailing end 25 of generally cylindrical configuration which is journaled in a drilled hole 26. The drilled holes 26 are parallel to and intersect laterally the holes 22 in order to provide a communicating opening between the holes 26 and 22 through which the shank 27 of the pawl extends. The incomplete cylindrical surface of the drilled holes 26 are sufficiently complete to retain the end portions of the pawls against displacement radially of the drilled openings without preventing a free pivotal movement of the pawls about the axis of the drilled openings.

The drilled holes 26 do not extend entirely through the rim 21, but terminate short of the left-hand face of the rim, as viewed in Figure 1, in consequence of which the pawls 24 cannot be displaced from the pawl carrier in a direction toward the left, as viewed in Figure 1.

Each pawl, as best shown in Figure 1, is provided with an integral, rearwardly projecting arm 28 having an upwardly extending end 29. The arms 28 project beyond the left-hand face of the rim 21 of the pawl carrier and, as best shown in Figure 2, support a flat ring 30 which lies parallel and close to the left-hand face of the pawl carrier rim, as viewed in Figure 1.

The upstanding ends 29 on the arms 28 overlie the outside of the ring 30 to prevent displacement of the ring. It will be observed that as a result of this arrangement, the ring 30 prevents displacement of the pawls 24 in a right-hand direction, as viewed in Figure 1.

One important function of the ring 30 is to counteract the effect of centrifugal force on the pawls and thus insure that the pawls will engage and maintain engagement with the hereinafter described ratchet wheel, as fully disclosed in applicant's prior Patent No. 2,218,398.

The present pawl carrier is very simply made by ordinary drilling operations to form the openings 22 and 26, and hence is simpler and less expensive than the particular form of pawl carrier disclosed in said prior patent. In addition, the novel location of the ring 30 greatly facilitates assembly.

Pawls 24 are adapted to co-operate with a ratchet wheel 32 having a plurality of ratchet teeth 33, best shown in Figure 4. The arrangement and number of pawls and ratchet teeth are such that one of the pawls will be in tooth holding position for each minute increment of movement of the pawl carrier relative to the ratchet wheel. Thus, as best shown in Figure 4, the uppermost pawl 24 is in holding engagement with a tooth of the ratchet wheel. On a slight increment of movement of the pawl carrier to the right, as viewed in Figure 4, the pawl to the right of the uppermost pawl will drop into engagement. On the next increment of such movement the next pawl will engage, and so on clockwise around the pawl carrier. Since there are nine pawls in the embodiment disclosed, there will be nine positions of engagement within a movement equal to the distance between the two adjacent ratchet teeth.

The ratchet wheel 32 is journaled on an internal, forwardly directed, annular projection 34 on the housing 14, as best shown in Figure 1. It will be observed that when the shaft 11 is rotating in a direction corresponding to forward movement of the vehicle the pawl carrier will move clockwise, as viewed in Figure 4, and the pawls will run idly over the teeth of the ratchet wheel; but when the vehicle moves rearwardly, one of the pawls will engage a tooth of the ratchet wheel and rotate or tend to rotate the ratchet wheel 32 in a counterclockwise direction, as viewed in Figure 4. The right-hand face of the ratchet wheel 32, as viewed in Figure 1, is provided with a plurality of dog clutch teeth 36, best shown in Figure 5, which are adapted to mesh with a corresponding set of dog clutch teeth 38 on an annular brake holding element 40, which is also journaled on the annular housing projection 34.

The dog clutch teeth on the ratchet 32 and holding member 40 are normally held in engagement by an annular movable cam ring 41 co-operating with a stationary annular cam ring 42. Cam ring 41 is journaled on the annular projection 34, while cam ring 42 is mounted on the same projection but, as best shown in Figure 8, is fixedly secured to the rear wall of the housing 14 in any suitable manner, as by screws 43. Movable cam ring 41 is provided with a plurality of circumferentially spaced projections 44 having sloping cam surfaces 45.

As best shown in Figure 10, the stationary cam ring is provided with a plurality of similarly spaced projections 46 having sloping cam surfaces 47. When the projections 44 and 46 are in engagement with each other, as shown in Figures 1 and 10, the dog clutch teeth on ratchet 32 and holding member 40 are in engagement; but on rotation of the cam ring 41 clockwise, as viewed in Figure 7, projection 44, as viewed in Figure 10, will move to the left with reference to projection 46 until the projection 46 clears the projection 44. On such cam release the dog clutch teeth 36 and 38 may disengage and their configuration is such, as shown in Figure 9, that they will automatically disengage if a force is being exerted tending to rotate the ratchet wheel counterclockwise with reference to the holding ring 40, as viewed in Figures 4 to 6. On such movement the ratchet wheel 32, as viewed in Figure 9, will tend to move to the left with reference to the holding ring 40, and it will be noted that the sides of the teeth 36 and 38 are sloped in such a manner that the resulting torque load will tend to cause the teeth to separate, the slope being slightly in excess of the angle of repose for the material of which the teeth are made. For steel clutch teeth, an angle of ten degrees (10°) with respect to the plane of the ratchet wheel has been found satisfactory to cause such automatic release.

As best shown in Figures 5 and 6, the dog clutch teeth 36 and 38 have a novel form which greatly simplifies the manufacture thereof. Thus, it will be noted that the spaces between the teeth 38 and the spaces between the teeth 36 are of uniform width, that is to say the sides of adjacent teeth 36 on the ratchet are parallel to each other and, consequently, may be formed by a single straight milling cut. The resulting teeth taper inwardly, but this is immaterial inasmuch as it is only necessary in the present device for a load to be taken on the clutch teeth in one direction. Accordingly, the load carrying side of each clutched tooth 36 lies in the same plane when the clutch is engaged as the co-operating load carrying side on one of the clutch teeth 38. The non-load carrying sides will not make surface contact, but this is immaterial since no reverse load can be applied to the teeth because of the one-way driving connection between the ratchet and pawl carrier. One simple method of locating the load carrying sides of the two sets of clutch teeth so that they will properly engage is to make the load carrying side of each slot project radially, as indicated by the dotted line 50 in Figure 6. Then the opposite side of the space will extend parallel to the line 50 but will not intersect the axis, as shown by the dotted line 51. If both sets of clutch teeth are made in exactly this manner, they will properly engage when meshed.

So long as the cam rings 41 and 42 are in the positions illustrated in Figures 1, 4 and 10, the tendency of the clutch teeth 36 and 38 to separate under load is resisted by the cams and the reaction force acting against the ratchet 32 is taken by a snap ring 51 mounted on a slot on the inner end of the annular projection 34.

The parts are shown in the drawing in their normal or operating position, that is the position they assume when the brake holding device is set to operate and the vehicle is moving forwardly. During these conditions, the ratchet 32 and holding ring 40 act as one unit. However, during forward rotation the pawl ring 18 rotates clockwise, as viewed in Figures 2 and 4, and, consequently, the ratchet 32 and holding ring 40 are free to move in either direction.

As best shown in Figure 6, holding ring 40 is provided with an integral projection 54 which extends into a recess 55 in one side of the housing 14. One radially extending wall 56 of the recess defines an abutment surface which is engaged by the projection 54 to limit counterclockwise rotation of the holding ring 40. Since this direction of rotation of the ring 40 occurs when the vehicle moves rearwardly, it is apparent that the projection 54 and abutment 56 positively limit rearward movement of the vehicle by restraining the propeller shaft, rear axle and wheels from rotation in a rearward direction. The mechanism so far described, therefore, is effective automatically to prevent the vehicle from rolling backwardly down a hill. However, by the same token, the mechanism would prevent intentional rearward motion of the vehicle and, consequently, it is for that reason that the cam rings and clutch arrangement are provided to permit disengagement of the holding ring 40 from the ratchet wheel 42. Any suitable means may be provided to shift the cam ring 41 when it is desired to drive the vehicle rearwardly, but the particular means illustrated, as best shown in Figures 3 and 7, is designed to effect clutch release when the reverse gear shift rail of the transmission is moved in a direction to complete engagement of the reverse gearing. Referring to Figure 7, the cam ring 41 is provided with an arm 58 upon the end of which is journaled a roller 59 which, in turn, is adapted to be engaged by a cam 60 mounted on an extension 61 of the reverse gear shift rail. When the reverse gear shift rail is moved rearwardly in order to shift the transmission into reverse gear, cam 60 engages roller 59, thereby rotating cam ring 41 clockwise, as viewed in Figure 7, and disengaging the projections 44 and 46 on the cam rings 41 and 42. As soon as the flat tops of the cam projections 44 and 46 are disengaged by cam 60, the load on the clutch teeth causes automatic disengagement of the clutch and also completes disengagement of the sloping cam surfaces 45 and 47. As a result of this arrangement, the flat tops of the teeth 44 and 46 are disengaged during the limited idle movement of the reverse shift rail 61 before the reverse gearing actually meshes. So long as the flat tops of the teeth 44 and 46 are disengaged before the reverse gearing meshes, no harm can be done because any load thrown on the clutch teeth 36 and 38 incident to actual engagement of the reverse gearing will complete the releasing movement of cam ring 41 and separation of the clutch teeth 36 and 38.

Inasmuch as the clutch teeth 36 and 38 may be released when they are subject to the full load incident to holding the vehicle against rolling backward downhill, it is necessary to use a large number of very small teeth in order to distribute the load. Otherwise, there would be a tendency on release to damage the corners of the teeth.

Plunger 64, slidable in a bore 65 in the wall of the casing and urged inwardly by a spring 66, normally acts on lever 58 in a direction tending to return it to the position shown in Figure 7. An adjusting plug 67 is provided for adjusting the tension of the spring 66.

When the vehicle is shifted out of reverse gear, the spring pressed plunger 64 tends to cause the cam surface 45 to ride up on the cam surface 47 and thereby bring the clutch teeth 36 and 38 into engagement. However, it will be noted that the clutch teeth 36 and 38 have flat top portions and that the width of the teeth is sufficient to substantially fill the spaces of the companion clutch element. Moreover, a very large number of small clutch teeth are provided. Consequently, if the vehicle is moving in reverse at the time the transmission is shifted out of reverse gear the relative movement between the ratchet 32 and the holding ring 40 will prevent the clutch teeth from meshing with each other. Under these circumstances, the tops of the teeth merely ride on each other, even though they are subject to the force exerted by the spring actuated cams 45 and 47 tending to force them into mesh. Actual meshing will not occur until the vehicle stops and relative movement between the ratchet 32 and the holding ring 40 ceases. The use of small teeth is important in this connection since it renders more likely juxtaposition of the teeth at the time relative rotation between the clutch elements 32 and 40 ceases. Moreover, in some cases the elements 32 and 40 will stop in such a position that the teeth 36 and 38 will not engage. If, under these conditions, the vehicle starts to roll rearwardly downhill, the resulting movement of the ratchet wheel 32 will bring the teeth into position to permit engagement. Since the teeth are very small, the ratchet will not be able to pick up any appreciable speed before this occurs.

The tension exerted by spring 66 may be made sufficiently strong to cause re-engagement of the clutch teeth without any other assistance, but in some cases it is desirable to keep the brake holding unit inoperative even after the transmission is shifted out of reverse gear and the vehicle is brought to a stop. Such a need arises, for example, when one wheel of the vehicle is in a hole and there is insufficient traction, in which event it is necessary to rock the vehicle back and forth. Accordingly, means are provided, as best shown in Figure 7, for causing re-engagement of the clutch teeth 36 and 38 only after the transmission is shifted out of reverse gear and the vehicle brakes are applied. In order to accomplish this result, the tension on spring 66 is either entirely eliminated or reduced to an amount insufficient of itself to shift the cam 41 against the influence of whatever friction is present and an auxiliary spring 72 is mounted in a projection 73 integral with the cam ring 41. Spring 72 seats within a blind socket in projection 73 and projection 73 and spring 72 lie in the previously described recess 55. The free end of spring 72 is adapted to be compressed by a rearwardly projecting wall 74 on the previously described projection 54 of the holding ring 40 when the holding ring is rotated counterclockwise, as viewed in Figures 6 and 7. It will be noted that, as viewed in Figure 7, clearance is provided between the free end of the spring 72 and the rearwardly projecting wall 74. This clearance is sufficient to allow the holding ring 40 to rotate counterclockwise during brake application without subjecting the spring 72 to compression. The end of the spring under such conditions should just contact the wall 74. As hereinafter brought out, when the vehicle brakes are applied manually the holding ring 40 will be rotated counterclockwise from the position shown in Figures 6 and 7 to a position in which the projection 54 contacts or nearly contacts the abutment 56. If the cam ring 41 is in its released position during such counterclockwise movement of the holding ring 40, the rearwardly projecting wall 74 will compress spring 72, thereby exerting sufficient force upon the cam ring 41 to rotate it in a counterclockwise direction and thereby effect engagement of the clutch teeth 36 and 38, in the manner previously described.

If the parts are so proportioned that the rotation of the holding ring 40 during manual brake application equals or exceeds the rotation of cam ring 41 from cam release to full cam engagement, the spring pressed plunger 64 may be dispensed with altogether, since in that event spring 72, alone, will effect engagement of the dog clutch teeth when the brake is applied. However, it is of advantage to reduce the movement of the holding ring 41 during brake application as much as possible, and it has been found that even though the movement of the holding ring is less than the movement of the cam ring the above described clutch engagement can be achieved by making spring 72 relatively stiff and by adjusting the spring 66 so that it is just insufficient to overcome static friction. In that event, spring 72, when loaded incident to manual application of the brakes, starts the clutch engaging movement of cam ring 41 and the light spring 72 carries the cam ring, once it has started moving, to its completely engaged position, shown in Figure 10.

The clearance shown between the free end of spring 72 and wall 74 is not essential, but if spring 72 contacts wall 74 when the parts are in the position shown in Figure 7, the spring 72 will resist counterclockwise rotation of the holding ring during brake application and, consequently, it would be necessary to eliminate spring 84 or reduce its tension to compensate.

By providing means, as above described, to delay re-engagement of the clutch teeth after the transmission has been shifted out of reverse gear until the brakes are applied is of advantage because it permits the driver to rock the car back and forth in order to get out of a hole, when there is insufficient traction. The fact that the device does not re-engage until the brakes are applied is not a disadvantage because the only circumstances under which it is desirable for the device to operate are those in which it would be natural to apply the brakes. Once the brakes are applied, the device becomes operative and will either prevent retrograde movement of the vehicle, as previously described, or maintain the brakes applied in the manner hereinafter set forth.

As previously indicated, the device is also effective to maintain the brakes applied after they have been applied either manually or by power means in the usual manner and the vehicle is brought to a stop. The means for accomplishing this function, as best shown in Figures 2 and 6, comprises a valve mechanism indicated generally at 80, the control of which is in part under the influence of the braking system of the vehicle and in part under the influence of the holding ring 40. As best shown in Figure 6, the holding ring 40 has an upward projection 81 which is normally held in engagement with a rod 82 by means of a plunger 83 which bears against the opposite side of the projection 81 and is urged to the right, as viewed in Figure 6, by means of a spring 84. The rod 82 projects through a suitable opening in the housing 14 into an axial bore 85 in the valve housing 86. The valve housing 86 is secured to a suitable boss on the housing 14 by means of cap screws 87. It will be observed that as a result of this construction the holding ring 41 is normally held in its extreme clockwise rotative position by means of the spring pressed plunger 83, as shown in Figure 6, in which position the rod 82 is likewise in its extreme right-hand position, as shown in Figure 2.

The valve housing 86 is provided with a central longitudinal bore 88 at the left-hand end of which is an upstanding annular valve seat 89 of smaller diameter than the bore 88. The opening 90 in the valve seat 89 communicates with the bore 85 of the housing. At the right-hand end of the central bore 88 the bore is enlarged to define a shoulder 91 and to the right of the shoulder 91 is again enlarged to define a shoulder 92. That portion of the bore to the right of shoulder 92 is threaded to receive a plug 93 having an externally threaded fitting 94 which is adapted for connection to the pressure supply line of a fluid braking system. The braking system may be either air or hydraulic and, if hydraulic, may be operated either manually or by a power booster apparatus. The particular form of valve illustrated in the drawings is designed for use in a hydraulic braking system and, consequently, the fitting 94 is connected to the pressure line from the master cylinder of the braking system. The housing is also provided with an auxiliary longitudinal bore 96 extending parallel to the central bore 88. A cross bore 97 connects the interior of the plug 93 with the auxiliary bore 96 and a second cross bore 98 connects bore 85 with the auxiliary bore 96 at the left-hand side of the valve seat 89. Cross bores 97 and 98 are plugged at their outer ends and so, likewise, is the right-hand end of the auxiliary bore 96. A threaded opening 99 in the lower side of the housing 86 communicates with the central bore 88 and is adapted for connection to the fluid line which runs to the brake operating cylinders.

Positioned within central bore 88 is a check valve having a head 102, the left hand or operative face of which carries an axial cylindrical projection 103 and is provided with an annular recess adapted to receive an annular ring 104 of rubber or rubber-like material. The check valve element is provided with a cylindrical rearward extension 105 having a square transverse opening 106 extending therethrough. As best shown in Figure 11, the rear or right-hand wall of the projection 105, as viewed in Figure 2, is provided with a slot 107 extending parallel to the square opening 106. A cylindrical piston element 108 is positioned within the central bore to the right of the check valve and is provided with a reduced stem 109 which projects through the slot 107 in the projection 105 and carries an enlarged head 110 located within the square opening 106. It will be apparent that as a result of this construction the piston 108 has a lost motion connection with the check valve 102. Surrounding and closely fitting the piston 108 and seated against the shoulder 91 in the housing is a ring 112 of rubber or rubber-like material which is pressed tightly against the shoulder 91 by means of the plug 93. The rubber ring 112 seals the bore 88 from the central opening in the plug 93. To facilitate such sealing action, the ring, if desired, may be provided with an axially extending annular lip 113. A coil spring 114 is positioned between the check valve head 102 and the rubber ring 112 and normally acts to urge the check valve into closed position.

Positioned within the bore 85 is a piston 116 having a stem 117 projecting to the right into engagement with the projection 103 on the check valve 102. A sealing ring 118 of rubber or rubber-like material surrounds the stem 117 or piston 116 and seals the valve unit against leakage through the bore 85 past the piston 116.

The operation of the valve unit 80 is as follows. When the master cylinder is actuated, the brake fluid under pressure enters the opening in the plug 93 and thence flows through cross bore 97, longitudinal bore 96, cross bore 98, opening 90 past the check valve 102 which opens in response to the fluid pressure, and thence through opening 99 to the vehicle brakes to operate the same in the usual manner. The pressure of the fluid from the master cylinder in the cross bore 98 acts on piston 116, forcing it to the left, as viewed in Figure 2, thereby shifting rod 82 to the left and rotating the holding ring 40 by reason of the connection between rod 82 and the projection 81 on the holding ring. This rotation is against the action of the spring pressed plunger 82. In a hydraulic braking system it is essential to reduce to a minimum all displacements of pressure fluid. Consequently, bore 85 and piston 116 are preferably made of very small diameter, in the order of three-eighths of an inch. When the brakes are applied, it is essential to the operation of the device that piston 116 be forced to the left by the brake pressure in order to disengage pin 117 from the check valve 102. Consequently, since it is desirable that the device operate to hold the brakes applied even when they are applied lightly, it is desirable that the plunger 116 be moved to the left under light brake application, that is at a pressure of about fifty pounds per square inch. Accordingly, spring 84, shown best in Figure 6, is made sufficiently light so that it will not resist the effect of a force of fifty pounds per square inch on the piston 116. Therefore, when that or any higher pressure is applied by the brake master cylinder, piston 116 and rod 82 move to the left, rotating the projection 81 and holding ring 40 counterclockwise, as viewed in Figure 6, against the action of spring 84. The brake fluid under pressure in cross bore 98 at the same time passes upwardly through opening 90 and past the valve 102 to the passageway 99 and thence to the vehicle brakes, to cause application thereof. As soon as flow of the brake fluid through opening 90 ceases, even though the pressure is maintained valve 102 is closed by the very light spring 114. This spring is only sufficient to close the valve against the force of gravity and any friction present. If the brake application is relieved before the vehicle comes to a stop, piston 116, under the influence of spring 84, immediately returns to the position shown in Figure 2, thereby opening valve 102 and releasing the brakes. However, if the vehicle is brought to a stop while the brakes are applied, ratchet wheel 18, which is fixed to the transmission shaft 11, will come to a stop and pawls 24 will engage ratchet wheel 32 and thereby hold the holding ring 40 with its projection 81 against return movement. If, under these conditions, the brake application has been released, piston 116 will not shift to the right, and consequently, valve 102 will remain closed and trap the fluid in the braking system, thereby maintaining the brakes applied.

When thereafter it is desired to drive the vehicle forwardly, the vehicle is operated in a conventional manner and as soon as a forward driving torque is applied to the transmission shaft 11 the slight movement of the shaft in a forward driving direction necessary to take up clearances and wind-up will rotate the cam ring 18, and, consequently, the ratchet wheel 32 and holding ring 40 sufficiently to return the projection 81 and rod 82 to the position shown in Figures 2 and 6, thereby opening valve 102 and releasing the brakes. In order to insure valve opening during such limited rotation of the shaft 11, it is necessary to effect valve opening by a very small movement. It is found that a movement of the projection 81 at a radius of about two inches of approximately three-sixteenths of an inch is available to open the valve. It is for this reason that the pawl and ratchet mechanism is designed to engage on very small increments of relative movement between the two. The resulting limited movement of piston 116 is of advantage because it reduces the fluid displaced by the mechanism during its operation.

In the operation so far described, the function of the plunger 108 and its connection with the valve 102 have been ignored. However, if the brakes are heavily applied, the pressure fluid trapped by check valve 102 may be at a pressure anywhere up to eighteen hundred pounds per square inch. Obviously, the relatively light spring 84, which must collapse on a pressure of fifty pounds per square inch acting against piston 116, cannot release an ordinary check valve against such high pressure unless the effective area of piston 116 was many times the effective area of valve 102. The size of piston 116 is, however, limited by the need to reduce fluid displacement in the unit and is preferably limited to a diameter of about three-eighths of an inch. If the effective area of valve 102 was made enough smaller than the piston 116 to make possible operation of the device on light brake application and release on heavy brake operation, it would therefore have to be exceedingly small and would tend to restrict flow in the brake system. Moreover, a metal to metal check valve, such as a ball check valve, has a tendency to leak when subject to heavy pressure unless made with extreme care; therefore, it is preferred to use a rubber to metal check valve and it is almost impossible to produce a satisfactory rubber to metal check valve of the exceedingly small dimensions required.

Accordingly, there is provided, as shown in the drawings, a rubber to metal check valve having an effective area comparable to that of the piston 116 and means, including plunger 108, are provided to counteract the effect of the trapped brake fluid on valve 102. When the vehicle brakes are applied brake fluid will flow through cross bore 97, bore 96, cross bore 98, port 90, past valve 102, and through opening 99 to the brake system. During such flow the pressure drop across port 90 is very small due to the fact that the spring 114 is very light, with the result that the pressure acting on the opposite ends of the plunger 108 is so nearly the same that the difference is insufficient to overcome the friction between plunger 108 and the sealing ring 112. Therefore, no appreciable movement of the plunger 108 to the left, as viewed in the drawing, occurs on brake application, and the valve opens by reason of the lost motion between the valve 102 and plunger 108 without being opposed by the plunger 108. Upon completion of this flow valve 102 will close trapping the fluid in the system provided the vehicle has been brought to a stop. However, the fluid trapped by valve 102 is then in open communication with the central bore 88 and acts against the left-hand end of the plunger 108. If at this time the brake application is released, the pressure at fitting 94 acting on the right-hand end of plunger 108 will reduce to zero. At that time, if there is any lost motion between the valve 102 and the plunger 108, the plunger 108 will move to the right, as viewed in Figure 2, taking up all lost motion between the head 110 and the projection 105 of valve 102. The ratio of the area of the port closed by valve 102 to the cross-sectional area of the plunger 108 is so chosen that the trapped brake pressure in central bore 88 acting to the right on plunger 108 will substantially balance all of the force exerted by the trapped fluid tending to hold the valve 102 closed. In view of the fact that a rubber seating ring 104 is employed on the valve 102, that valve does not have a readily ascertained seating area and, therefore, it is necessary to determine the proper cross-sectional area of plunger 108 in any given installation by experiment. In actual practice it is found in one case that a sufficient balance can be obtained to enable the light spring 84 to open valve 102 against eighteen hundred pounds per square inch trapped in the brake system if the plunger 108 has a diameter of .190 inch and the valve seat for valve 102 has an internal diameter of .1875 inch and an external diameter of .3125 inch. In this connection it should be noted that the seating surface of valve seat 89 has a conical angle tending to cause the seating area to approach the outside diameter of the seat. In the particular installation mentioned, this conical angle was between one and two degrees from a plane transverse to the axis of the valve housing. With these proportions, the check valve 102 was found to hold at any pressure and yet could be opened against pressures up to eighteen hundred pounds per square inch by a spring 84 which exerted a total valve releasing force of between seven and eight pounds.

It is further found that with a valve constructed in the manner and of the dimensions given above, if the diameter of the plunger 108 were slightly increased the valve mechanism would operate in the manner described above except that it would open automatically when the pressure at passageway 99 exceeded a predetermined amount. Thus, for example, with a plunger diameter of .195 inch the valve would automatically open when the pressure at passageway 99 exceeded four hundred and fifty pounds per square inch. With plunger diameters intermediate .190 inch and .195 inch, the valve would open at correspondingly higher pressures. In some cases, as, for example, when the unit is employed on heavy trucks where considerable heat is developed in the neighborhood of the brake cylinders, it is advantageous to employ a valve mechanism which will automatically release on overload since otherwise damage to the braking system due to expansion under heat might result when valve 102 is closed.

The reason for the above described operation is not fully understood because it is not possible to ascertain the effective seating area of the valve 102 and, therefore, it is not known whether that area exceeds or is less than the area of a plunger of .195 inch in diameter in the particular case given. It may be that the plunger diameter slightly exceeds the effective seat diameter, in which event the automatic opening would occur when the trapped brake pressure was sufficient to create a valve releasing force which would overcome friction and the effect of spring 114. In this connection, the yieldable character of one of the valve elements introduces an uncertain factor.

In view of the above, it will be understood that while the valve mechanism is referred to herein and in the appended claims as a balanced valve, it is meant only that the valve is substantially balanced so that it can be opened by a light mechanical force. Actual experience indicates that it is not possible to calculate the effective areas and achieve the desired results. Accordingly, it is necessary for any given design of valve and valve seat to determine the area of the balancing plunger by cut and trial methods to achieve the desired results.

The lost motion connection is provided between the valve 102 and the plunger 108 also takes care of the possibility that while the vehicle was in motion and the brakes applied the valve 102 might close momentarily while piston 116 was in its left-hand position, as viewed in Figure 2. If at that instant it was desired to apply the brakes harder without further releasing them, a one-piece balanced valve would either not open or would open too sluggishly to give satisfactory performance. Because of the lost motion connection, valve 102 does not act as a balanced valve in response to pressure from fitting 93 but opens promptly in response to any excess of pressure at the left side of the valve 102. The possibility of valve 102 closing under the above described conditions is remote if the unit is properly balanced and piston 116 is made very small in diameter because in that event valve 102 would be unlikely to close except on sufficient brake pedal releasing movement to permit piston 116 to return to the position shown in Figure 2 and mechanically open valve 102. Therefore, the lost motion connection may be dispensed with under these conditions and the plunger fixed to the valve, if desired.

As shown in Figure 2, an auxiliary lever 120 projects through a slot 121 in the valve housing 86 and is pivoted thereto at 122. The lever has a downwardly projecting end portion extending into a slot 123 in the piston 116. The purpose of the lever 120 is to provide means for rendering the valve mechanism 80 inoperative at will, and any suitable means may be provided for controlling the actuation of the lever 120. It is generally not considered safe to rely on hydraulic brakes for parking purposes because of the possibility of leakage in the wheel cylinders and elsewhere. Accordingly, lever 120 may be connected to the mechanical parking brake by a cable in such a manner that setting of the parking brake opens valve 102. This releases the hydraulic brakes and enables the operator to know when the parking brake is sufficiently applied to hold the vehicle.

It will be observed that the operation of the mechanism disclosed in Figures 1 to 11, inclusive, is entirely automatic when the vehicle is operated in the conventional manner. Thus, during normal driving when the brakes are applied without stopping the car the ratchet mechanism does not engage and, therefore, on an almost imperceptible releasing movement of the master brake cylinder piston the very small piston 116 moves to the right and opens valve 102. Consequently, the brakes operate in the usual manner. The device only holds the brakes applied after the vehicle has been brought to a stop by application of the brakes, and the brakes are automatically released when the vehicle is started forwardly in the conventional manner. When the brakes are being held by the mechanism they are effective to hold the vehicle against unauthorized movement, either forwardly or rearwardly. The device is automatically rendered inoperative at the initial movement of the reverse shift rail toward reverse gear position, and it returns automatically to operative condition either on disengagement of the reverse gearing or on disengagement of the reverse gearing and a subsequent brake application. In addition to the above mentioned functions, the device operates to prevent unauthorized backward movement of the vehicle even though the brakes are not applied, and the releasing means is effective to release the mechanism even when it is heavily loaded by a tendency of the vehicle to roll backwardly. It will be apparent that the mechanism disclosed in Figures 1 to 11 may be employed in any hydraulic or fluid brake system, regardless of the source of the braking pressure or the means for controlling that source.

In addition to the function of preventing forward or rearward movement of the vehicle down a grade, it will be obvious that the device, by holding the brakes applied, will also prevent vehicle movement otherwise induced. For example, it will prevent the forward creep which occurs in vehicles equipped with a non-positive fluid clutch or coupling when the vehicle transmission is in a forward gear and the engine is idling. The action in such case is the same as that when the forward movement is induced by a down grade. If the device is constructed in the manner previously described, the slight torque transmitted to the propeller shaft by the fluid clutch when the engine is idling will take up clearances and backlash but will not wind up the propeller shaft sufficiently to cause release of the valve that holds the brakes applied. However, as soon as the engine is accelerated in the usual manner required to start a fluid clutch equipped vehicle forwardly, the resulting increased torque on the propeller shaft will cause sufficient wind-up or twisting of the shaft (and/or the rear springs if the vehicle has a Hotchkiss drive) to cause release of the brakes.

In this connection, if the vehicle is brought up to a stop by application of the brakes when the transmission is in any gear and the friction clutch engaged, the brakes will remain engaged regardless of the engine speed and the torque transmitted through the fluid clutch at the time the vehicle is brought to a stop, and they will automatically release on a slight increase of engine speed above that at the time of stopping. This is due to the fact that at the moment the vehicle is brought to a stop the full wind-up of the propeller shaft due to the then transmitted torque has already occurred and the position of the pawl carrier 21 at the time the pawls engage the ratchet 32 is the position it would assume after that amount of torque was applied to the propeller shaft. Consequently, the ratchet will prevent release of the brakes until such time as the torque is further increased by increasing the engine speed.

The above mentioned characteristic of the device is important because the idling speed of vehicle engines varies widely and, consequently, the torque transmitted at idling speed correspondingly varies. Such variation will not, however, affect the operation of the device. In addition, it enables the device to operate in the same manner regardless of what gear ratio of the transmission has been selected. It will also operate if the hand throttle control has been set to increase the engine speed, as is sometimes necessary when the engine shows a tendency to stall at low speeds. It will also operate as well in cold weather when the fluid in the fluid clutch is more viscous and, therefore, transmits a greater torque for the same engine speed, as it will in hot weather when the torque transmitted is less.

The expression "check valve" as used in the claims refers to a valve which will open in response to an excess of pressure at one side and closes in the absence of an excess at said side. A balanced check valve is one in which the forces exerted by the pressure of the trapped fluid on the movable valve element are balanced. A substantially balanced check valve is one in which the net force exerted on the movable valve element by the trapped fluid in the path of valve movement is small compared with the force which would be exerted by the trapped fluid on an area equal to that of the port closed by the valve.

What is claimed is:

1. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port and operable to permit substantially unrestricted flow in the opposite direction, a pressure responsive movable element in said housing, said element being at one side thereof subject to the pressure at the first port and at the other side subject to the pressure at the second port and being of a cross-sectional area approximately equal to the effective cross-sectional area of said check valve, a sealing ring frictionally engaging said element intermediate its ends, and a lost motion connection between said element and said check valve for causing said element when subject to an excess of pressure in the second port to exert a force on said valve in the direction opposite to that of the force exerted on the valve by the pressure in the second port without affecting said valve when said element is subject to an excess of pressure in the first port sufficient to open the check valve.

2. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port and operable to permit substantially unrestricted flow in the opposite direction, a pressure responsive movable element in said housing, said element being at one side thereof subject to the pressure at the first port and at the other side subject to the pressure at the second port and being of a cross-sectional area approximately equal to the effective cross-sectional area of said check valve, a sealing ring frictionally engaging said element intermediate its ends, a lost motion connection between said element and said check valve for causing said element when subject to an excess of pressure in the second port to exert a force on said valve in the direction opposite to that of the force exerted on the valve by the pressure in the second port without affecting said valve when said element is subject to an excess of pressure in the first port sufficient to open the check valve, and means for opening said check valve at will.

3. A control valve device for an automatic holding mechanism for fluid operated brakes comprising a valve housing having a port adapted for connection to a source of fluid pressure and a second port adapted for connection to a fluid brake device, said housing having a passageway connecting said ports, a substantially balanced check valve in said passage normally acting to prevent flow of fluid from said second port to said first mentioned port, an element in said housing operable from the exterior of the housing and effective on movement in one direction to open said check valve, and means responsive to pressure at said first port for moving said element in the opposite direction to permit closure of said valve.

4. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port, said valve being substantially balanced against the effect of pressure in said second port, an element in said housing operable from the exterior of the housing and effective on movement in one direction to open said check valve, and means responsive to pressure at said first port for moving said element in the opposite direction to permit closure of said valve.

5. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port, means connected to the check valve and subject to the pressure at the second port for counteracting the effect of the check valve of at least a part of the force exerted by the pressure at the second port to hold the check valve closed, an element in said housing operable from the exterior of the housing and effective on movement in one direction to open said check valve, and means responsive to pressure at said first port for moving said element in the opposite direction to permit closure of said valve.

6. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port, a pressure responsive movable element in said housing, said element being at one side thereof subject to the pressure at the first port and at the other side subject to the pressure at the second port, a connection between said element and said check valve for causing said element when subject to an excess of pressure in the second port to exert a force on said valve in the direction opposite to that of the force exerted on the valve by the pressure in the second port, an element in said housing operable from the exterior of the housing and effective on movement in one direction to open said check valve, and means responsive to pressure at said first port for moving said element in the opposite direction to permit closure of said valve.

7. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port and operable to permit substantially unrestricted flow in the opposite direction, a pressure responsive movable element in said housing, said element being at one side thereof subject to the pressure at the first port and at the other side subject to the pressure at the second port and being of a cross-sectional area approximately equal to the effective cross-sectional area of said check valve, a sealing ring frictionally engaging said element intermediate its ends, a lost motion connection between said element and said check valve for causing said element when subject to an excess of pressure in the second port to exert a force on said valve in the direction opposite to that of the force exerted on the valve by the pressure in the second port without affecting said valve when said element is subject to an excess of pressure in the first port sufficient to open the check valve, an element in said housing operable from the exterior of the housing and effective on movement in one direction to open said check valve, and means responsive to pressure at said first port for moving said element in the opposite direction to permit closure of said valve.

8. A control valve device for an automatic holding mechanism for fluid operated brakes comprising a valve housing having a port adapted for connection to a source of fluid pressure and a second port adapted for connection to a fluid brake device, said housing having a passageway connecting said ports, a substantially balanced check valve in said passage normally acting to prevent flow of fluid from said second port to said first mentioned port, an element in said housing operable on movement in one direction to open said check valve, resilient means constantly urging said element in said direction, means responsive to pressure at said first port for moving said element in the opposite direction to permit closure of said valve, and latch means adapted to hold said element in the position in which it permits closure of said valve.

9. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port, said valve being substantially balanced against the effect of pressure in said second port, an element in said housing operable on movement in one direction to open said check valve, resilient means constantly urging said element in said direction, means responsive to pressure at said first port for moving said element in the opposite direction to permit closure of said valve, and latch means adapted to hold said element in the position in which it permits closure of said valve.

10. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port, means connected to the check valve and subject to the pressure at the second port for counteracting the effect of the check valve of at least a part of the force exerted by the pressure at the second port to hold the check valve closed, an element in said housing operable on movement in one direction to open said check valve, resilient means constantly urging said element in said direction, means responsive to pressure at said first port for moving said element in the opposite direction to permit closure of said valve, and latch means adapted to hold said element in the position in which it permits closure of said valve.

11. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port, a pressure responsive movable element in said housing, said element being at one side thereof subject to the pressure at the first port and at the other side subject to the pressure at the second port, a connection between said element and said check valve for causing said element when subject to an excess of pressure in the second port to exert a force on said valve in the direction opposite to that of the force exerted on the valve by the pressure in the second port, an element in said housing operable on movement in one direction to open said check valve, resilient means constantly urging said element in said direction, means responsive to pressure at said first port for moving said element in the opposite direction to permit closure of said valve, and latch means adapted to hold said element in the position in which it permits closure of said valve.

12. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port and operable to permit substantially unrestricted flow in the opposite direction, a pressure responsive movable element in said housing, said element being at one side thereof subject to the pressure at the first port and at the other side subject to the pressure at the second port and being of a cross-sectional area approximately equal to the effective cross-sectional area of said check valve, a sealing ring frictionally engaging said element intermediate its end, a lost motion connection between said element and said check valve for causing said element when subject to an excess of pressure in the second port to exert a force on said valve in the direction opposite to that of the force exerted on the valve by the pressure in the second port without affecting said valve when said element is subject to an excess of pressure in the first port sufficient to open the check valve, an element in said housing operable on movement in one direction to open said check valve, resilient means constantly urging said element in said direction, means responsive to pressure at said first port for moving said element in the opposite direction to permit closure of said valve, and latch means adapted to hold said element in the position in which it permits closure of said valve.

13. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port but permitting relatively unrestricted flow in the opposite direction, said valve comprising a pair of cooperating members adapted to make a substantially annular seating contact in a plane approximately transverse to the direction of movement of the valve, one of said members being formed of yielding rubberlike material, and means having a lost motion connection with the check valve and subject to the pressure at the second port for counteracting a sufficient portion of the valve closing force exerted on the valve by the pressure at the second port, said means having an effective area subject to the pressure at said second port which slightly exceeds the effective seating area of said check valve whereby said means prevents said valve from holding the fluid under pressure at the second port when the pressure at the second port reaches a predetermined amount, and means independent of the pressure at either of said ports for opening said check valve.

14. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port and operable to permit substantially unrestricted flow in the opposite direction, a plunger mounted for axial reciprocation in a portion of said housing, and being at one end subject to the pressure at the first port and at the other end subject to the pressure at the second port, a sealing ring frictionally engaging said plunger intermediate its ends, and a lost motion connection between said plunger and said check valve for causing said plunger, when subject to an excess of pressure in the second port, to exert a force on said valve in the direction opposite to that of the force exerted on the valve by the pressure in the second port without affecting said valve when said plunger is subject to an excess of pressure in the first port sufficient to open the check valve.

15. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway, resilient means normally acting to hold said valve in position to prevent return of fluid through said passageway from the second port to the first mentioned port and operable to permit substantially unrestricted flow in the opposite direction, a plunger mounted for axial reciprocation in a portion of said housing and being at one end subject to the pressure at the first port and at the other end subject to the pressure at the second port, a sealing ring frictionally engaging said plunger intermediate its ends, and a lost motion connection between said plunger and said check valve for causing said plunger, when subject to an excess of pressure in the second port, to exert a force on said valve in the direction opposite to that of the force exerted on the valve by the pressure in the second port without affecting said valve when said plunger is subject to an excess of pressure in the first port sufficient to open the check valve.

16. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway normally acting to prevent return of fluid through said passageway from the second port to the first mentioned port and operable to permit substantially unrestricted flow in the opposite direction, a plunger mounted for axial reciprocation in a portion of said housing and being at one end subject to the pressure at the first port and at the other end subject to the pressure at the second port, a sealing ring frictionally engaging said plunger intermediate its ends, a lost motion connection between said plunger and said check valve for causing said plunger, when subject to an excess of pressure in the second port, to exert a force on said valve in the direction opposite to that of the force exerted on the valve by the pressure in the second port without affecting said valve when said plunger is subject to an excess of pressure in the first port sufficient to open the check valve, and means for opening said check valve at will.

17. A control valve device for an automatic holding mechanism for fluid operated brakes comprising a valve housing having a port adapted for connection to a source of fluid pressure and a second port adapted for connection to a fluid brake device, said housing having a passageway connecting said ports, a check valve in said passageway, resilient means normally acting to hold said valve in position to prevent return of fluid through said passageway from the second port to the first mentioned port and operable to permit substantially unrestricted flow in the opposite direction, a plunger mounted for axial reciprocation in a portion of said housing and being at one end subject to the pressure at the first port and at the other end subject to the pressure at the second port, a sealing ring frictionally engaging said plunger intermediate its ends, a lost motion connection between said plunger and said check valve for causing said plunger, when subject to an excess of pressure in the second port, to exert a force on said valve in the direction opposite to that of the force exerted on the valve by the pressure in the second port without affecting said valve when said plunger is subject to an excess of pressure in the first port sufficient to open the check valve, and means for opening said check valve at will.

CHARLES M. JAMESON.

REFERENCES CITED

The following references are of record in the file of this patent:

UNITED STATES PATENTS

| Number | Name | Date |
| --- | --- | --- |
| 240,982 | Dutton | May 3, 1881 |
| 427,264 | Iwanowitsch | May 6, 1890 |
| 480,528 | Thoms | Aug. 9, 1892 |
| 677,592 | Patrick | July 2, 1901 |
| 688,166 | Gaylord | Dec. 3, 1901 |
| 758,970 | Jackson | May 3, 1904 |
| 831,433 | Hendrickson | Sept. 18, 1906 |
| 842,587 | Skogstad | Jan. 29, 1907 |
| 1,515,100 | Foster | Nov. 11, 1924 |
| 1,990,741 | Marvel | Feb. 12, 1935 |
| 2,166,029 | Vorech | July 11, 1939 |
| 2,181,700 | Leichsenring | Nov. 28, 1939 |
| 2,225,082 | Orshansky | Dec. 17, 1940 |
| 2,313,232 | Freeman | Mar. 9, 1943 |
| 2,313,430 | Goepfrich | Mar. 9, 1943 |
| 2,361,685 | Grise | Oct. 31, 1944 |